United States Patent

Seilheimer

(10) Patent No.: US 7,458,726 B2
(45) Date of Patent: Dec. 2, 2008

(54) BEARING, PARTICULARLY RUBBER BEARING

(75) Inventor: Joachim Seilheimer, Solingen (DE)

(73) Assignee: Stabitec Stanz-Biegetechnik GmbH, Wülfrath (DE)

( * ) Notice: Subject to any disclaimer, the term of this patent is extended or adjusted under 35 U.S.C. 154(b) by 260 days.

(21) Appl. No.: 11/342,093

(22) Filed: Jan. 26, 2006

(65) Prior Publication Data

US 2006/0257058 A1 Nov. 16, 2006

(30) Foreign Application Priority Data

May 12, 2005 (EP) .................... 05010322

(51) Int. Cl.
*F16C 25/00* (2006.01)
*F16C 33/02* (2006.01)

(52) U.S. Cl. .................. 384/276; 384/273; 29/898.058

(58) Field of Classification Search ................ 384/156, 384/272–276, 295, 316; 29/898.03, 898.054, 29/898.058; 403/271
See application file for complete search history.

(56) References Cited

U.S. PATENT DOCUMENTS

| 556,819 | A | * | 3/1896 | De Gain | 138/156 |
| 578,801 | A | * | 3/1897 | Wilmot | 138/156 |
| 1,913,204 | A | * | 6/1933 | Larzelere | 384/276 |
| 2,464,653 | A | * | 3/1949 | Phipps | 277/534 |
| 2,855,252 | A | * | 10/1958 | Budinger et al. | 384/276 |
| 3,238,601 | A | * | 3/1966 | White | 29/898.058 |
| 3,273,601 | A | * | 9/1966 | De Gain | 138/166 |
| 4,311,348 | A | * | 1/1982 | Olschewski et al. | 29/898.03 |
| 4,538,647 | A | * | 9/1985 | Saurenman et al. | 138/166 |
| 4,907,626 | A | * | 3/1990 | Mori | 138/156 |
| 4,909,638 | A | * | 3/1990 | Muto | 384/273 |
| 4,988,217 | A | * | 1/1991 | Iijima | 384/273 |
| 6,386,763 | B1 | * | 5/2002 | Mack et al. | 384/272 |
| 6,755,405 | B2 | | 6/2004 | Kammel et al. | |

FOREIGN PATENT DOCUMENTS

| DE | 100 49 611 C2 | 8/2002 |
| DE | 203 15 477 U1 | 1/2004 |
| DE | 205 15 477 U1 | 1/2004 |

* cited by examiner

*Primary Examiner*—Marcus Charles
(74) *Attorney, Agent, or Firm*—Collard & Roe, P.C.

(57) ABSTRACT

A bearing, particularly a rubber bearing, has in its fundamental structure at least one bearing bushing and one rubber body surrounded by the bearing bushing. The bearing bushing has at least one longitudinal parting line having edge profiles that are complementary to one another, provided at adjacent longitudinal edges. The tines and tine recesses, respectively, engage into one another at the edge profiles which are complementary to one another. The tine along the one longitudinal edge, in each instance, dips into a related tine recess on the other longitudinal edge, essentially in the circumference direction of the bearing bushing in the course of production. During this process, the tine is plastically deformed by a predetermined measure, so that the tine and the related tine recess wedge into one another.

9 Claims, 3 Drawing Sheets

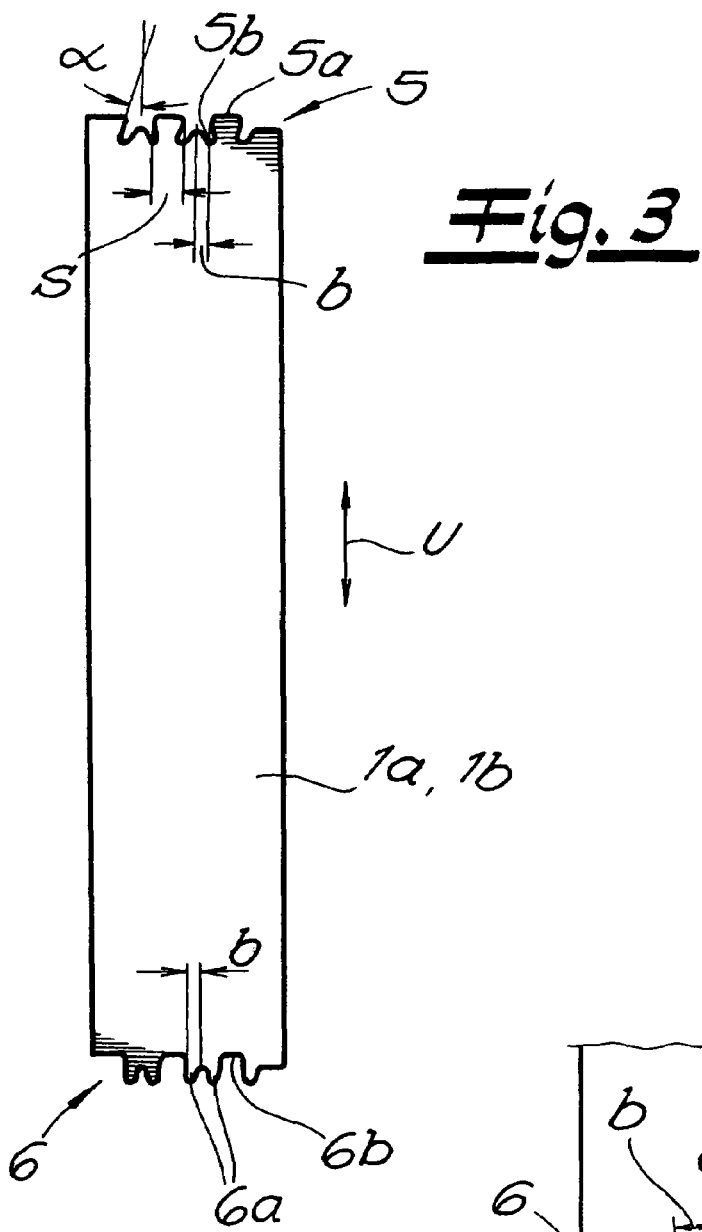
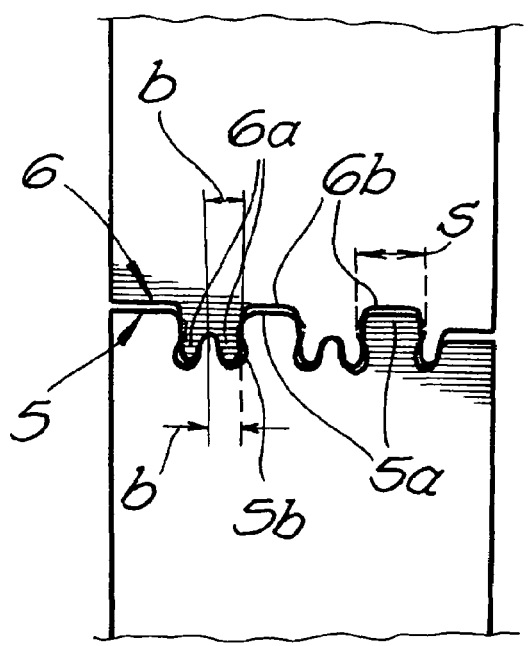

BEARING, PARTICULARLY RUBBER BEARING

CROSS REFERENCE TO RELATED APPLICATIONS

Applicant claims priority under 35 U.S.C. § 119 of European Application No. 05 010 322.5 filed on May 12, 2005.

BACKGROUND OF THE INVENTION

1. Field of the Invention

The present invention relates to a bearing, particularly a rubber bearing. The bearing has at least one bearing bushing and one rubber body surrounded by the bearing bushing. The bearing bushing has at least one longitudinal parting line having edge profiles provided at adjacent longitudinal edges, the tines and tine recesses of which, respectively, engage into one another. Usually, several tines and tine recesses are implemented.

2. The Prior Art

A bearing of this type is described in DE 100 49 611 C2, or also in the utility model DE 203 15 477 U1. In this connection, a vulcanization carrier is used as the bearing bushing in DE 203 15 477 U1, which is produced from a metal strip that is bent to form a pipe shell. In fact, an inner shell and an outer shell are implemented, which are connected with one another by means of embossing, according to a preferred embodiment.

The bearing according to DE 203 15 477 U1 has proven itself, but encounters problems in practice. These problems arise because the rubber body enclosed by the bearing bushing via embossing the two shells with one another is weakened in the embossed regions. These problems particularly arise if this rubber body is intended to absorb torsional movements that can result in cracks or weakening of the rubber body. This situation is where the invention takes its starting point.

SUMMARY OF THE INVENTION

It is an object of the present invention to further develop a bearing of the embodiment described initially so that simple production is achieved and damage to the rubber body, seen over its entire running time, is precluded.

These and other objects are accomplished, according to the invention, by providing a bearing of the type stated, particularly a rubber bearing, in which the tine along the one longitudinal edge, in each instance, dips into a related tine recess on the other longitudinal edge, in the course of the production of the bearing bushing, essentially in the circumference direction of the bearing bushing. As this dipping occurs, the tine is plastically, not elastically, deformed by a certain measure. In this manner, tine and related tine recess permanently wedge into one another.

In this way, the bearing bushing in question can easily be configured in two shells, with an inner shell and an outer shell, whereby the two shells are fitted with at least one inner longitudinal parting line and one outer longitudinal parting line. If these two parting lines are now not disposed overlapping one another in the radial direction, and the two shells form a bond with one another so that the tines along the one longitudinal edge, in each instance, engage in related tine recesses on the other longitudinal edge of the shell, in each instance, a lock coupling of the two shells is achieved directly. This lock coupling may be a positive lock coupling, a non-positive lock coupling, or both. For this purpose, all that is required is to reduce the diameter of the outer shell, during the course of connecting tines and tine recesses, to such an extent that the inner shell, which was produced previously, is firmly surrounded, and the two shells essentially "flow" into one another. In this way, a permanent plastic connection of the two shells, with a defined inside diameter of the bearing bushing for accommodating the rubber body, is made available.

It is therefore not necessary to additionally emboss the two shells once again, to bond them, or also to glue them together. This additional step is unnecessary because the connection according to the invention, between the tine and the related tine recess, in each instance, in the sense of plastic wedging or clawing together, ensures that the shell assumes the desired outside diameter, i.e. that the two shells are perfectly coupled with one another.

In this connection, tine and tine recess can alternate next to one another, also in pairs, on each edge profile, so that the tine or tines of the one edge profile dips into the tine recess of the other edge profile along the longitudinal parting line and vice versa. It should be emphasized that usually, several tines and several tine recesses are implemented on each edge profile. Nevertheless, the invention does, of course, also include embodiments that are fitted with only one tine and one tine recess per edge profile.

In order to support the process of wedging of tine and tine recess as described, the one edge profile is fitted with ridge tines, while the other edge profile has swallowtail tines. In this connection, the ridge tines generally dip into ridge tine accommodations that run at a slant relative to the circumference direction, while the swallowtail tines interact with U-shaped tine accommodations.

When the ridge tines consequently dip into the ridge tine accommodations that run at a slant, they are deflected at a slant during this process, so that wedging between ridge tine and ridge tine accommodation automatically takes place. This wedging takes place because the width of the ridge tine essentially corresponds to the width of the ridge tine accommodation, and the ridge tine is plastically deformed during the process described.

Something similar occurs when the swallowtail tine, in each instance, interacts with the U-shaped tine accommodation. In this case, the head of the swallowtail tine is configured to be slightly wider than the swallowtail tine. As a result, when the swallowtail tine dips into the U-shaped tine accommodation, the head in question is displaced in the direction towards the foot of the swallowtail tine and in this way the desired wedging effect in the U-shaped tine accommodation takes place. In this connection, the tines are fitted with rounded heads, in each instance, in order to promote or guarantee that they slide and dip into one another during the pressing procedure, in the circumference direction of the bearing bushing, so that the edges of the tine, on the one hand, and the tine accommodation, on the other hand, can slide along one another.

It has proven itself if the bearing bushing is configured as a strip-like vulcanization carrier. This configuration means that according to the preferred embodiment, the bearing bushing is a (metal) strip onto which the rubber body is vulcanized, generally after its deformation to form a bearing bushing or pipe shell. For this purpose, the strip-shaped vulcanization carrier, i.e. the metal strip that defines the bearing bushing, can have a coating on its side that faces the rubber body. This coating can be a primer, an adhesive, or the like, without restriction, which promotes the adhesion of the elastomer that is subsequently injection-molded onto or into the interior of the bearing bushing, to form the rubber body.

This process is further facilitated if the bearing bushing is first pre-pressed to a certain diameter dimension, and undergoes final pressing only afterwards. With this method of procedure, the rubber body can be applied directly to the pre-pressed bearing bushing, while the hardness of the rubber body is adjusted and adapted to requirements during the course of final pressing. In fact, the spring characteristic line of the rubber body can be influenced by means of the degree of pressing, in such a manner that it goes along with a greater spring constant, in other words is "harder."

In this connection, the pre-pressing described is undertaken so that the tines and tine recesses, respectively, engage into one another in each instance. Specifically the tines and tine recesses engage into one another by a predetermined measure, which corresponds with a specific diameter reduction of the pipe shell or bearing bushing formed in this manner. This diameter can now be reduced further, in that the pipe shell is additionally impacted on the circumference during the course of final pressing. In this way, during final pressing both the ridge tines and the swallowtail tines now reach the bottom of the ridge tine accommodation, on the one hand, and the U-shaped tine accommodation, on the other hand, which they had not yet reached during pre-pressing.

The bearing described can be used in motor vehicles, i.e. in the automotive sector, and here, for example, as a vibration damper or for vehicle components of the steering, without restriction. Use in the region of the axle as a contact buffer, cardanic shaft suspension, engine suspension, etc., is also possible. Likewise, such bearings can also be used in the household sector, for example in washing machines, dishwashers, as well as dryers.

Finally, a particularly important embodiment fits the edge profiles with tongues that alternately overlap. In this manner, it is ensured that the pipe shell or bearing bushing that is produced, with the engaged tines and tine recesses, is not bent open by subsequent processing steps, for example, or opened at the longitudinal parting line. In this connection, the tongues, in each instance, can be produced by means of a simple embossing process. The invention recommends the use of aluminum, steel, or stainless steel as the material for the bearing, although other metallic materials or plastics are, of course, not precluded. Material combinations can also be implemented, for example if the work is being done with an inner shell and an outer shell.

In this case, it is furthermore recommended to seal the inner shell and the outer shell in the region of their contact surface, if necessary, in order to prevent the penetration of moisture, dirt, etc. In most cases, however, such sealing is unnecessary. The two shells essentially flow into one another as a result of the deformation process described and follow one another without any gap.

In the end result, the bearing according to the invention proves itself by reason of its simple production. All that is necessary is to fit at least one metal strip with the complementary edge profiles at the ends, and then to bend it in the sense of a pipe shell, so that the tines and tine recesses, respectively, can engage into one another in the circumferential direction. If two metal strips are used, according to the preferred embodiment, in order to define an inner shell and an outer shell, it is not necessary to additionally connect these two shells with one another mechanically. Instead, the wedging of the tines and tine recesses, respectively, at the complementary edge profiles, which accompanies the reduction in diameter, ensures that the two shells are essentially pressed onto one another with longitudinal parting lines disposed so as not to overlap one another, and enter into an intimate connection without any additional measures.

In this way, embossing, in particular, can be avoided, so that the inner shell is smooth on its inside surface that faces the rubber body, and consequently damage to the rubber body can be precluded. Significant advantages therefore result.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 3 shows an individual pipe shell, i.e. the sheet-metal strip required for its production, in the non-bent state;

FIG. 4 shows the region of a longitudinal parting line of the pipe shell, in each instance, in the non-pressed state.

DETAILED DESCRIPTION OF PREFERRED EMBODIMENTS

Figure 2:
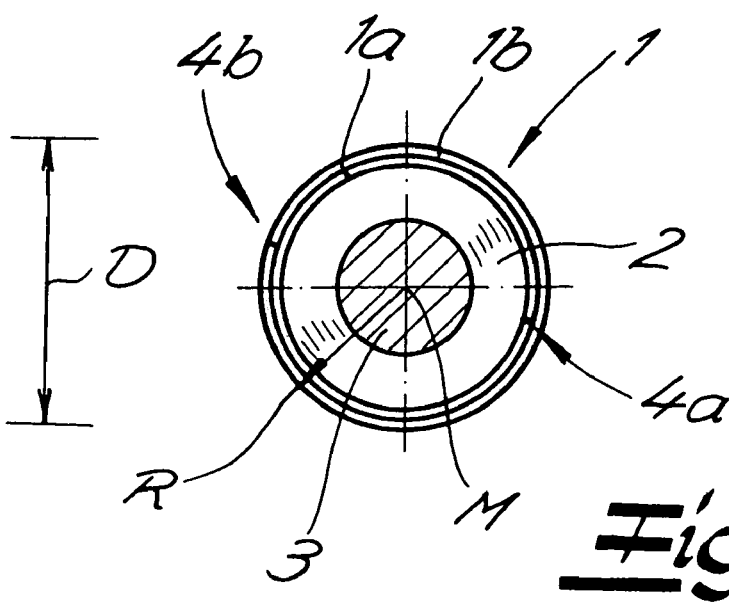
FIG. 2 is a front view of the embodiment according to FIG. 1.

The drawings show a bearing, according to the exemplary embodiment a rubber bearing. The bearing has, as shown in FIG. 2, a bearing bushing 1, which is configured, without restriction, as a vulcanization carrier 1. The bearing is reinforced and/or attached in a bearing accommodation, a bearing eye, etc., using bearing bushing 1. Within the scope of the exemplary embodiment, bearing bushing 1 ensures that a rubber body 2 made of an elastomer plastic provided within its interior and merely indicated encloses a profile rod 3, damping it. This profile rod 3 can be, without restriction, a steering rod of an axle bearing.

Figure 1:
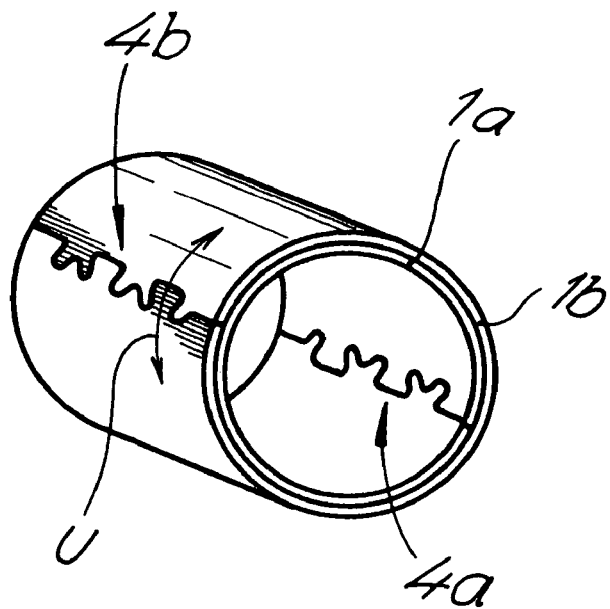
FIG. 1 is a schematic perspective view of the bearing according to an embodiment of the invention.

On the basis of FIG. 1, it is best evident that bearing bushing 1 has two longitudinal parting lines 4a, 4b, in each instance. One can see that the two longitudinal parting lines 4a, 4b are fitted with a complementary edge profile 5, 6, in each instance, on adjacent longitudinal edges, in each instance. Each edge profile 5, 6 has tines 5a, 6a that engage into one another, as well as related tine recesses 5b, 6b.

In fact, within the scope of the representation, ridge tines 6a can be differentiated from swallowtail tines 5a. Ridge tine accommodations 5b correspond to the ridge tines 6a, while the swallowtail tines 5a interact with U-shaped tine accommodations 6b. The tines 5a as well as 6a, and the tine accommodations 5b and 6b lie next to one another, in each instance, on edge profile 5, 6, in each instance, and alternate (if applicable, in pairs), as can be seen in FIG. 3. In this manner, tines 5a of one edge profile 5 dip into tine recesses 6b of the other edge profile 6, in each instance, along longitudinal parting line 4a, 4b, in each instance, and vice versa. In other words, the tines 6a of the other edge profile 6 interact with the tine accommodations 5b of the other edge profile 5.

On the basis of FIGS. 1, 2, and 4, it is evident that the tine 5a, 6a, in each instance, on the one longitudinal edge, dips into the related tine recess 6b and 5b, respectively, on the other longitudinal edge, essentially in the circumference direction U of bearing bushing 1, and during the course of production of bearing bushing 1 is plastically deformed by a certain measure as this dipping happens. In this way, tines 5a, 6a and tine recesses 6b, 5b wedge into one another.

In fact, tines 5a, 6a have rounded heads, in each instance, whereby the width b of the ridge tines 6a is adapted to the width b of the related ridge tine accommodations 5b. Because the related ridge tine recess 5b for the ridge tine 6a runs at a slight slant relative to the circumference direction U (see angle a in FIG. 3), and the width b of the ridge tine 6a corresponds to that of ridge tine recess 5b, ridge tine 6a can dip into ridge tine recess 5b, but as its dip-in path increases, it is deformed along the circumference direction U, i.e. deflected along the angle α. In other words, ridge tine 6a is plastically deformed as it dips into related ridge tine recess 5b, and wedges into ridge tine recess 5b as it dips in further.

Something comparable occurs with the respective swallowtail tines 5a. Because its head has a width s that exceeds the width of the U-shaped tine recess 6b, the broadened head of the swallowtail tine 5a is increasingly displaced in the direction of the foot of the swallowtail tine 5a and ensures the desired wedging effect between the swallowtail tine 5a and the U-shaped tine recess 6b. This wedging effect is evident from a comparison of FIG. 4 with FIG. 1. FIG. 4 shows the complementary tines 5a, 6a in the non-deformed state, and FIG. 1 shows the finished, pressed bearing bushing 1.

In fact, bearing bushing 1 has two pipe shells or shells 1a, 1b, which are produced, in each instance, from a metal strip of steel or aluminum, for example, as shown in FIG. 3. In this connection, the inner shell or pipe shell 1a is produced first, and then inserted into the outer shell or pipe shell 1b. In this process, the two related longitudinal parting lines 4a, 4b are disposed so as not to overlap in the radial direction R. In other words, proceeding from a center point M of bearing bushing 1, either only the one parting line 4a or only the other parting line 4b is cut in this radial direction R. Therefore, the two longitudinal parting lines 4a, 4b cannot be disposed essentially behind one another, along the radial direction R, in any case.

In this connection, it has particularly proven itself if the inner longitudinal parting line 4a and the outer longitudinal parting line 4b are placed lying opposite one another (with reference to the center point M), as is indicated in FIG. 1. The two pipe shells 1a, 1b are connected with one another in that the two related metal strips are pressed together with one another by means of a reduction in their diameter, in each instance. During this process, the tines 5a, 6a, in each instance, increasingly dip into the corresponding tine recess 5b, 6b.

This process can take place in segments, in that bearing bushing 1 is first pre-pressed to a specific diameter dimension, and afterwards pressed into final form. In the pre-pressed state, rubber body 2 is usually vulcanized onto the inner shell 1a. In this case, tines 5a, 6a have not yet completely dipped into related tine recesses 5b, 6b. This dipping occurs only during the course of final pressing. In this manner, the "hardness" of rubber body 2 can be adjusted at the same time, namely in that the diameter D of bearing bushing 1, in total, undergoes a desired variation between the pre-pressed and the final pressed state.

The smaller the diameter D of bearing bushing 1 is adjusted to be in the final pressed state, the harder rubber body 2 is generally adjusted to be in its interior, in the damping of profile rod 3.

Figure 5:
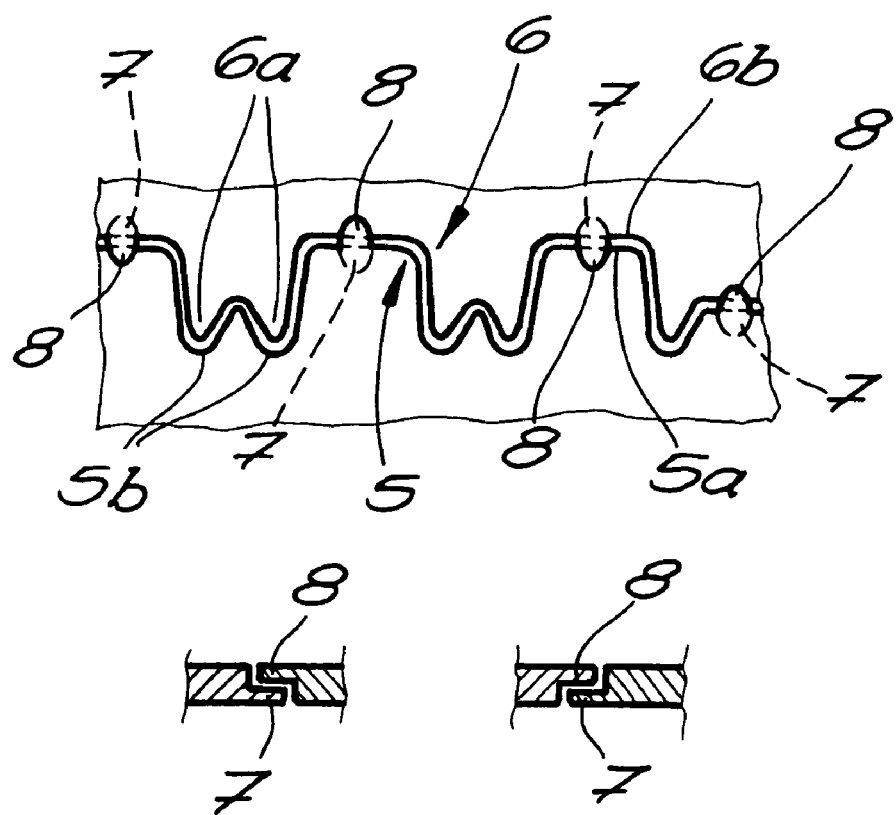
FIG. 5 shows the region of the longitudinal parting line in a modified embodiment, in a top view and partly in cross-section.

FIG. 5 shows a modified embodiment, in which tongues 7, 8 are additionally implemented on edge profiles 5, 6, in addition to tines 5a, 6a and the related tine recesses 5b, 6b, which tongues partly overlap. Tongues 7, 8, in each instance, are implemented on edge profile 5, 6, in each instance, by means of an embossing process or suitable measures. In this connection, tongue 8 overlaps tongue 7 that lies beneath it, in each instance. It can be seen that on edge profile 5, tongues 8 that lie on the top and tongues 7 that lie on the bottom alternate. Related edge profile 6 has a corresponding, complementary configuration, as the cross-sectional representation in FIG. 5 makes clear. In this way, it is prevented that inner shell 1a and, in particular, outer shell 1b, in each instance, can bend open in the region of the related longitudinal parting line 4a, 4b. Within the scope of the exemplary embodiment, tongues 7, 8 that alternately engage into one another are provided on edge profiles 5, 6 in the region of swallowtail tines 5a and related U-shaped recesses 6b, in each instance, but this arrangement is not compulsory.

Although at least two embodiments have been shown and described, it is to be understood that many changes and modifications may be made thereunto without departing from the spirit and scope of the invention as defined in the appended claims.

What is claimed is:

1. A bearing comprising:
   (a) at least one bearing bushing; and
   (b) at least one rubber body surrounded by said at least one bearing bushing;
   wherein said at least one bearing bushing comprises at least one longitudinal parting line having a plurality of edge profiles provided at adjacent longitudinal edges of said at least one bearing bushing, said edge profiles comprising a plurality of tines and tine recesses engaging respectively into one another;
   wherein each respective tine along one longitudinal edge dips into an associated tine recess on another longitudinal edge during production of the bearing and is plastically deformed by a selected amount;
   wherein said at least one bearing bushing comprises an inner shell and an outer shell, each shell having a corresponding parting line disposed so as not to overlap one another in a radial direction;
   wherein the inner shell and the outer shell are connected with one another in a connecting process wherein first and second metal strips respectively forming the inner shell and the outer shell are pressed together with one another via a reduction in respective diameters of the inner shell and the outer shell; and
   wherein during the connecting process. each respective tine increasingly dips into the associated tine recess.

2. The bearing according to claim 1, wherein said tines and tine recesses alternate next to one another on each edge profile, so that the tines of each respective edge profile dip into the tine recesses of another edge profile along said at least one longitudinal parting line.

3. The bearing according to claim 1, wherein a first edge profile has ridge tines and a second edge profile has swallowtail tines.

4. The bearing according to claims 3, wherein said plurality of tine recesses comprise ridge tine recesses running at a slant relative to a circumference direction and said ridge tines dip into said ridge tine recesses.

5. The bearing according to claim 3, wherein said plurality of tine recesses comprise U-shaped tine recesses and said swallowtail tines interact with said U-shaped tine recesses.

6. The bearing according to claim 1, wherein each tine has a rounded head.

7. The bearing according to claim 1, further comprising a coating provided on a side of the at least one bearing bushing that faces the rubber body.

8. The bearing according to claim 1, wherein the at least one bearing bushing is first pre-pressed to a selected diameter dimension, and then pressed into a final form.

9. The bearing according to claim 1, wherein the edge profiles are fitted with alternately overlapping tongues.

* * * * *